April 25, 1967  A. D. LA RUE ETAL  3,316,485
BEAM CURRENT MEASUREMENT BY INDUCTIVE TECHNIQUES FOR HIGH
FREQUENCY ELECTRON DISCHARGE DEVICES
Filed Oct. 8, 1962
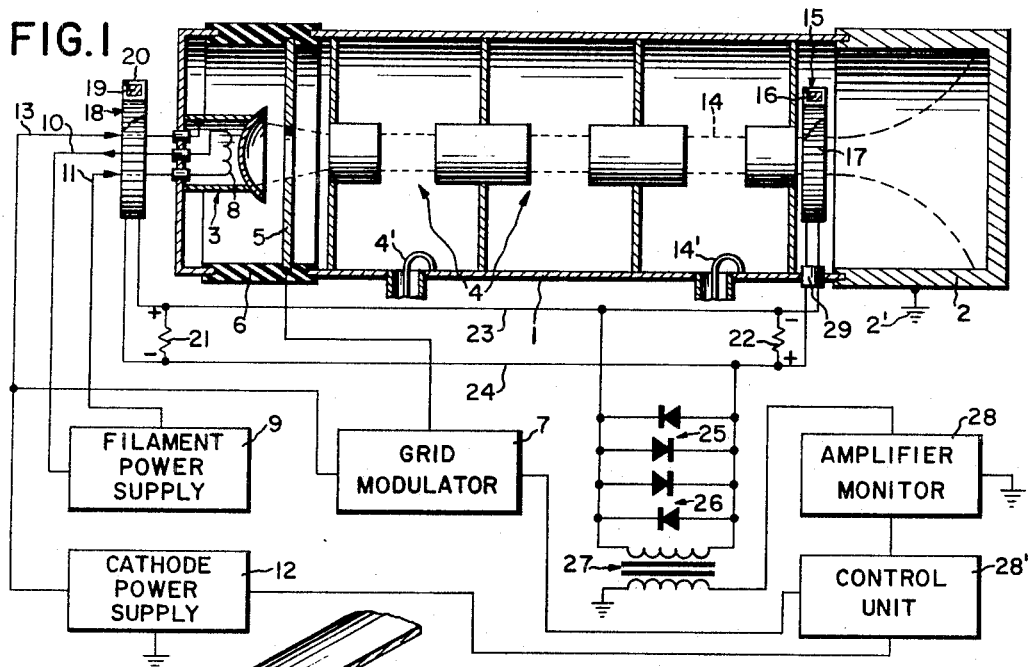
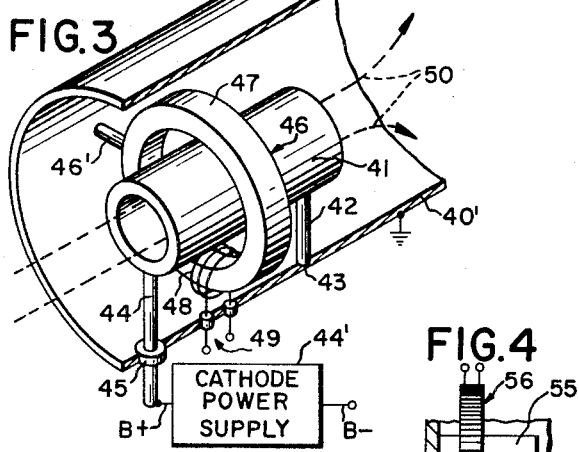
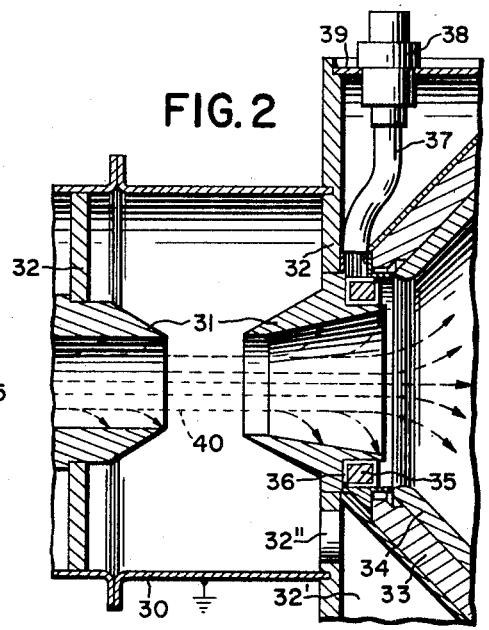
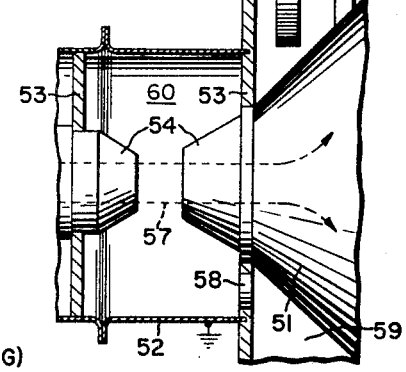
INVENTORS
RICHARD H. L. BIBB
ALBERT D. LA RUE
ROBERT S. SYMONS
BY *Harry E. Aine*
ATTORNEY 3,316,485
BEAM CURRENT MEASUREMENT BY INDUCTIVE TECHNIQUES FOR HIGH FREQUENCY ELECTRON DISCHARGE DEVICES
Albert D. La Rue, Los Altos, Richard H. L. Bibb, Palo Alto, and Robert S. Symons, Los Altos, Calif., assignors to Varian Associates, Palo Alto, Calif., a corporation of California
Filed Oct. 8, 1962, Ser. No. 229,057
10 Claims. (Cl. 324—24)

The present invention relates in general to charged particle beam devices of the beam current type, for example, klystron or traveling wave tubes or the like, and more specifically to current mensuration in such beam devices.

Present day requirements in the field of long range radar and missile tracking radar, for example, have necessitated the development of increasingly higher power pulsed beam tubes of the klystron and traveling wave types. Pulsed beam klystrons having average power outputs of above 50 kilowatts and peak power outputs of above 5 million watts are not uncommon. Similarly, pulse beam travelling wave tubes having average power outputs of above 3 kilowatts and peak power outputs above 2 million watts are not uncommon. Accompanying the above mentioned extremely high power outputs are beam currents that range above 100 amperes peak in klystron tubes and above 50 amperes peak in traveling wave tubes.

Beam currents of the above mentioned magnitude require increasingly larger dimensioned collectors to be used in high power beam tubes in order to maintain the power density on the collector surfaces below maximum permissible limits, the limits being determined by such factors as collector diameter, collector bulk, cooling techniques, etc. It is conventional practice to maintain D.C. isolation between the collector body and the main tube shell in klystron and traveling wave tubes, although in some cases collectors have been of a non-D.C. isolated type, and indications of collector and body currents have been obtained by means of the thermal energies present in these separate parts of the tubes. That is, the relative temperatures of the parts of or coolants used with them have served to indicate areas of beam impingment. Such methods are felt to be crude, to say the least.

A comparatively thin metal shell is utilized for the tube body in comparison to the collector body thickness in conventional tubes. This disparity in thickness results from obvious design considerations such as overall weight reduction and the ratio of the tube body current and collector current. Since the shell has no cooling provisions normally, and since the shell is thinner than the collector, the capacity to handle heat of the shell is much lower than the capacity to handle heat of the collector. The collector current resulting from the beam particles impinging thereon is of a higher magnitude than the tube body current. Tube body current or, more simply, body current results from a deviation of the electrons or other particles which constitute the beam current from the intended beam path. These deviations cause electrons or other particles to impinge on the interior metal surfaces of the tube body and result in what is commonly referred to as body current.

Generally it is desirable to employ monitoring instrumentation to indicate both body and collector currents. This instrumentation can be integrated with the tube power supply if desired to provide automatic cutoff of the power to the tube if the monitor indicates that the tube is operating at too high a level of body current. Alternately the monitoring instrumentation can provide simple visual or audible indication of body, collector, and total current levels or can provide both control and indication simultaneously. Since normal design techniques for high power tubes provide for insulation of the collector from the tube body, conventional measuring techniques can be used to provide an indication of body and collector currents.

However, with the advent of higher beam current operating levels occurring, for example, in tunable broad band klystrons, the collectors may approximate vessels of 20 inches inside diameter and 40 inches length, or even larger. The huge size of such collector structures present myriad mechanical design problems with regard to the insulation and support means for such collectors on the tube bodies. Furthermore, problems in vacuum sealing and cooling provisions, which require providing suitable means for allowing the inlet and egress of hundreds of gallons of water per minute while maintaining high vacuum conditions within the tube body, become increasingly difficult as the size of the insulated collector increases.

Additionally, and perhaps most serious of all, is the electrical problem which arises because of the large size of the collector interior and the annular or other shaped space produced by the insulation between the collector surfaces and the metal structures electrically connected to the tube body. The large dimensions of these parts will support countless resonant modes coincident in frequency with those of the main tube operating frequency and its harmonics. Many of these modes will couple to the beam at the capacitive gap between the collector and the tube body or at the insulation junction. Present techniques for dealing with these resonances include: shifting the frequencies of competing modes; reducing the gap impedance by use of UHF chokes; introducing lossy materials at or near the gap; and/or other loading schemes for reducing the effective Q of competing resonances.

The operating power levels of these high power tubes require that the techniques utlilized in counteracting the above mentioned spurious modes cover frequencies up to the third harmonic of tube operating frequencies and probably even up to the fourth harmonic. Because of the design constraints imposed by the main purpose of the collector, it is doubtful that the techniques enumerated above can ever offer more than partial solutions to the problems presented by spurious modes. In any event, such solutions will add greatly to the complexity of the tube design and thus may present more problems than are solved.

The utilization of a non-insulated collector would greatly simplify mechanical design problems and would eliminate the coaxial resonant modes existing in the annular space between the collector and metallic members connected electrically to the tube body. Cavity modes supported in the collector interior would remain. These interior modes, however, are fewer in number, and the majority of these modes do not have good coupling to the electron beam, since no short gap ordinarily exists to enhance beam coupling.

In view of the above discussion it is readily apparent that it would be highly desirable to employ a non-insulated collector assembly in high power level pulsed klystrons and the like. However, when utilizing a non-insulated collector assembly, the problem of measurement of body and collector currents arises since the collector is not in D.C. isolation with respect to the body, and conventional instrumentation techniques can no longer be employed.

The present invention provides a novel solution to the problem of obtaining measurements of body and collector currents in higher power pulsed electron discharge devices such as klystrons, traveling wave tubes and the like, and in particular those having non-insulated collectors. Since body current should be carefully monitored due to the always present possibility of overload conditions occurring and consequent overheating of the body shell material which has a comparatively low capacity to handle heat, monitoring instrumentation capable of providing an individual indication of body current is very desirable. This invention provides a novel solution to the problem of obtaining an individual indication of body current in high power pulsed electron discharge devices.

Accordingly, it is a principal object of the present invention to provide novel measuring means for monitoring body current, collector current and total current in a high power pulsed electron discharge device having a non-insulated collector.

A feature of the invention is a novel beam current measuring technique involving the use of a current transformer surrounding the beam of a pulsed electron discharge device whereby an accurate indication of beam current value is obtained.

Another feature of this invention resides in providing novel means to measure beam current supplied to the collector and total current supplied to the cathode of a pulsed beam tube.

An additional feature of this invention resides in providing means to measure beam current supplied to the collector and total current supplied to the cathode of a pulsed beam tube and to provide additional means whereby the two currents can be subtracted to thereby provide an indication of body current.

A further feature of this invention resides in providing novel means to measure beam current at any point along an electron discharge device extending from the cathode to the collector by utilizing the beam itself as a primary and a surrounding measuring winding or line as the secondary, thereby forming a current transformer for providing an accurate indication of beam current.

Another feature of the present invention resides in positioning a measuring line or measuring winding around a pulsed beam of electrons or other particles to thereby induce current in said measuring line or winding and provide a calibrated indication of beam current.

Another feature of the present invention resides in surrounding a pulsed beam of electrons or other charged particles with a magnetic ring having a winding wound thereon to function as the secondary winding of a transformer wherein the beam itself functions as a single turn primary winding.

Another feature of the present invention resides in surrounding a pulsed beam of electrons with a coaxial sleeve conductor through which total beam current can flow in opposition to beam current delivered to the collector to thereby produce oppositely directed opposed magnetic fields which will cancel to the degree that the remaining field is effectively proportional to the tube body current and may be made use of to measure body current.

Another feature of the present invention resides in providing a pulsed electron discharge device or the like with a current transformer positioned near the collector to provide an indication of beam current delivered to the collector.

Still another feature of the present invention resides in positioning a conducting member on the exterior of an electron discharge device or the like between the collector thereof and the end plate or other nearby conductive surface of the last cavity of said electron discharge device and surrounding said conductive member with means for determining the current flowing therein which current is proportional to the body current of said electron discharge device.

Still another feature of the present invention resides in providing body current, total current and collector current monitoring means to an electron discharge device having a non-insulated collector structure.

Still another feature of the instant invention resides in placing the beam current to collector measuring device in a high vacuum atmosphere.

These and other features and advantages of the present invention will become more apparent after a perusal of the following specification taken in connection with the accompanying drawings wherein.

FIG. 1 is a diagrammatic cross-sectional view of an electron discharge device embodying the current measuring techniques of the instant invention, FIG. 2 is a fragmentary cross-section view of a klytron tube non-insulated collector assembly with the novel beam current measuring means embodied therein, FIG. 3 is a diagrammatic perspective view of another embodiment of the current measuring technique of the instant invention, FIG. 4 is a fragmentary perspective view of another embodiment of the current measuring technique of the instant invention, and FIG. 5 is a circuit diagram of an additional subtractive connection between any two current measuring transformers of the present invention.

Referring now to FIG. 1 in more detail, for purposes of illustration there is shown a high power pulsed electron discharge device of the klystron type embodying the novel beam current measuring technique of the instant invention. The body shell 1 can be of any structurally sound material such as stainless steel having an interior lining of copper or alternatively of any other suitable materials well known in the art. The shell 1 may be tubular or of any other configuration required by normal design considerations and is closed by a collector structure 2 at one end and a beam forming cathode structure 3 at the other end. The collector 2 is generally an enlarged mass of material having good heat dissipation properties and in this embodiment is shown as being conductively connected to the shell 1 by suitable means such as a brazed joint. The conductively connected shell and collector structures are commonly grounded as shown at 2'. The shell 1 of a typical high power pulsed electron discharge device generally contains any number of interaction means such as cavity resonators 4 whereby high frequency electromagnetic energy coupled into the shell by any suitable technique such as a coaxial coupling 4' may interact with the electron beam. The device of FIG. 1 can have for purposes of illustration, a suitable modulating anode 5 mounted on insulation means 6 with accompanying floating modulation power supply means 7. The cathode 3 is generally provided with suitable filament means 8 and accompanying power supply means 9. In the instant case the filament leads 10, 11 are so arranged and constructed that current flowing therein is oppositely directed as shown by the arrows so as the result in cancellation of the accompanying magnetic fields in each lead 10, 11 along a suitable length of the leads 10, 11. The reasons for this provision will be apparent for the reasons set forth hereinafter. Appropriate cathode power supply means 12 are provided and connected to cathode 3 by lead 13. The tube shell 1, collector 2 and power suppy means 12 are generally grounded as shown.

The cathode 3 and accompanying power supply and grid modulator 7 are so arranged as to provide a high power pulsed electron beam 14 which traverses the length of the interaction means 4 and is finally absorbed by the collector 2. In klystron amplifiers, the last cavity resonator is provided with a suitable output means represented by coaxial coupler 14' for extracting R.F. energy from the klystron. Suitable beam focusing means such as a magnet (not shown) are generally employed to restrict the beam to a given path and shape.

Shown at 15 and 18 are two current transformers which surround the beam 14 near the collector end of the shell and the cathode and filament leads 13, 10 and 11, respectively. The current transformers each preferably comprise an annular core of magnetic material 16, 19 around each of which is wound a measuring line or windings 17, 20 of a suitable number of turns. The winding 17 of transformer 15 is brought out through a vacuum insulated joint 29 to the exterior of the shell 1 while the winding 20 is shown exteriorly of the shell. Each of the transformers 15, 18 is provided with suitable insulation, casing means and appropriate mounting means. For example, transformer 15 may be mounted as shown in FIG. 2 and transformer 18 may be mounted on a suitable insulator surrounding the cathode and filament supply leads. The windings 17, 20 of each of the transformers are connected across matched resistors 21, 22 each of which may have a typical design value of 20 ohms or any other suitable value. Conductors 23, 24 form a loop current path for the transformer, windings 17, 20 and resistors 21, 22. The windings 17, 20 are connected such that current induced therein in the manner described below will be in a subtractive relation and therefore only a difference current will flow in conductors 23, 24.

It is desirable to select a matched pair of transformers 15, 18 and resistors 21, 22 since this selection results in a considerable simplification of the monitoring circuitry. Two pairs of matched diodes 25, 26 are connected across conductors 23, 24 and through isolation transformer 27. The output of the isolation transformer 27 is then connected to any suitable monitoring means such as amplifier monitor 28 which may be provided with audio or visual indicating instruments for monitoring body current. Amplifier monitoring means 28 may be connected to a suitable control unit 28' as shown, having relay means therein which unit serves to turn off the grid modulator 7 and thus the beam and/or the cathode power supply if overload conditions are present by removing the pulse from the grid modulator to the modulation anode or removing the D.C. from the cathode power supply 12 to the cathode.

The operation and function of the device including the novel beam current measuring means is as follows. A pulsed beam of electrons emitted from cathode 3 traverses the cavity resonator 4 and is absorbed by the collector 2. As the beam traverses the cavity resonators 4 stray electrons will deviate from the main beam and impinge on the conductive surfaces of the resonators including shell 1 thereby generating body currents therein. Since it is highly desirable to know the value of these currents so as to prevent overloading and possible melting of the shell structure appropriate monitoring instrumentation must be provided as previously mentioned. Transformer 18 is positioned around cathode lead 13 and filament leads 10, 11. Leads 10 and 11 are adapted and arranged so as to provide for cancellation of the magnetic fields caused by the current flowing therein in the vicinity of the area occupied by the transformer 18. Thus the resultant magnetic field threading through the magnetic core of transformer 18 is entirely that set up by the current supplied to the cathode 3 by lead 13 which serves as a one turn primary winding for transformer 18. Therefore the current induced in winding 20, which functions as the secondary winding, by the flux threading core 19 is directly proportional to the total current supplied to the cathode by the pulsed cathode power supply 12, thereby providing an accurate measurement of total current.

Transformer 15 is positioned around the beam of electrons at the point of entry of the beam into the collector. The beam itself being composed of a pulsed group of electrons serves as the primary winding in this case and generates its own magnetic field which threads the magnetic core 16 of transformer 15. The flux threading core 16 and the current induced in winding 17 are directly proportional to the beam current delivered to the collector thus providing an accurate measurement of collector current.

The transformer secondary windings 17, 20 are connected in subtractive relation as indicated above and thus the resultant voltage developed across the primary of isolation transformer 27 is directly proportional to body current and suitable monitoring instrumentation can be provided at the output of isolation transformer 27 to provide an accurate indication of body current by means of amplifier monitor 28 and/or to control the power supply 12 and/or grid modulator 7 as mentioned above. There are two methods of connecting the transformers in the subtractive connection, either in series (bucking) or in parallel (opposed polarity) as shown in FIGS. 5 and 1, respectively.

A typical example of the above mentioned beam current measuring technique incorporated in a high power pulsed beam klystron tube having a non-insulated collector with the current measuring transformers positioned around the cathode leads and the beam at the entry portal to the collector resulted in very accurate measurements of body, total and collector currents. Values of 84 amps total current, 83.5 amps collector current, and .5 amp body current were obtained, which values were in agreement with the theoretical approximations.

It is highly desirable to employ two matched pairs of voltage clipping diodes 25, 26 across the current loop 23, 24 to prevent saturation of magnetic cores 16, 19 in the event of high currents induced therein. The first set operate as slow switches to limit the voltage across windings 17, 20 to a design value of roughly .6 volt and the second pair 26 also limit the voltage across windings 17, 20 to roughly .6 volt and differ from the first pair only in that their switching time is considerably faster thus affording double protection against saturation of magnetic cores 16, 19. The above stated design values are given by way of example only and are not to be deemed limiting in any sense.

It is of importance to accurately position the current transformers symmetrically about the beam and cathode lead so as to provide an exact indication of the body current since if the magnetic cores were non-symmetrically positioned relative to the beam axis a different transformer output is obtained then when symmetrical positioning is uitlized. Thus an inaccurate reading of body current would be obtained if transformer 18 were symmetrical about cathode lead 13 while transformer 15 was non-symmetrically positioned about the beam.

The present invention is not limited to placement of the two transformer windings about the cathode lead exteriorly of the shell vacuum or interiorly of the shell vacuum at a point just prior to the collector structure. This novel beam current measuring technique may be advantageously employed by positioning the transformer windings at any two spaced positions along the path of the beam current to thus present a differential analysis of the beam and body currents along any given portion of the beam 14 and shell 1.

Furthermore it is to be noted that the core and winding which comprise what is referred to as a current transformer are in reality only the secondaries thereof and that, in the case of the cathode positioning, the cathode lead 13 serves as the primary winding while in the case where the core and winding surround the beam the beam itself serves as a single turn primary winding. However since the magnetic core and winding function as a transformer when in operation the above mentioned terminology seems appropriate.

The preferred shape of the magnetic core is circular, however any other closed or open core shape such as rectangular, triangular, diamond, etc. may be employed as desired. Similarly, the winding is preferably a true toroidal winding extending completely about the core. However this is not mandatory and a partial winding encompassing only a small portion of the peripheral distance around the core may be employed. Furthermore, the magnetic core may contain a gap or a displaced portion upon which the winding is wound. A simple air-core secondary winding may also be employed but has very poor response so that a magnettic core is definitely preferred. Additionally it is contemplated that C.W. (continuous wave) devices may be adapted and arranged so as to be capable of being pulsed as desired to enable measurement of body current levels therein by the novel measuring technique of the present invention.

Furthermore, the instant invention is not limited to electron discharge devices but may be advantageously employed with other pulsed or C.W. devices utilizing charged particles of a non-electron type such as ions or protons by way of example.

In FIG. 2 is shown a typical beam measuring current transformer positioned near the non-insulated collector of a high power pulsed beam klystron tube. The embodiment shown in FIG. 2 is a typical example of a specific application of the novel current measuring device depicted in FIG. 1 as applied to a non-insulated collector of a high power pulsed klystron tube.

Shown therein are conductive shell 30 grounded as shown, conductive drift tubes 31, conductive cavity end plates 32, output waveguide 32' and output iris 32", magnet pole piece 33, collector 34, magnetic annular transformer core 35 and toroidal winding 36, and transformer leads 37, suitably insulated and extending through vacuum joint coaxial insulator assembly 38 to the exterior of shell portion 39. A pulsed electron beam 40 is shown traversing the tube length and terminating on the interior collector surface. The beam current transformer measuring current delivered to the collector is positioned in an annular off-set portion formed on the exterior surface of the last drift tube.

Since the transformer is subjected to high heat and vacuum conditions, suitable thermal protection is required. Ceramic-coated copper leads for the transformer are desirable.

The arrows shown deviating from a true axial path of the electron beam are representative of the cause of body currents as the beam traverses the tube length. Since the current transformer core 35 is positioned in this embodiment just prior to the collector surface, the current induced in winding 36 will produce an accurate indication of collector current. The collector 34 is conductively connected to the shell 30, 39 and drift tube sections 31 of the tube and prior art spurious coaxial modes generated through utilization of an insulated collector are thereby eliminated as explained previously.

In FIG. 3 is shown an alternative beam current measuring technique wherein a direct indication of body current is achieved through use of a single current transformer. Shown therein is shell member 40, grounded as shown, coaxial sleeve conductor 41 mounted within shell 40' by conductive support member 42 conductively connected at one end to one end of sleeve 41 and conductively connected at the other end 43 to shell member 40'. Conductor 44 is conductively attached to the opposite end of sleeve 41 and brought out through a suitable insulated joint 45 to the exterior of shell 40'. A current transformer 46 surrounds sleeve 41 and is mounted in shell 40' by suitable means 46'. Current transformer 46 comprises an annular magnetic core 47 with a measuring winding or line 48 wound thereon. Suitable leads and insulating joints, generally indicated at 49, are provided for winding 48 to permit attachment of appropriate monitoring instrumentation thereto exteriorly of shell 40'.

A pulsed electron beam, generally indicated by broken line 50, traverses tube shell 40' in the direction indicated and diverges at the collector (not shown) as indicated by the spread of the arrows. The beam current measuring device shown in FIG. 3 provides an accurate indication of body current in the following manner. Assuming sleeve 41 and transformer 46 to be positioned just prior to the collector structure of a high power pulsed electron discharge device having a non-insulated collector structure, the electron beam threading internally of sleeve 41 and transformer 46 will then induce flux in core 47 in one direction which flux will be proportional to the collector current. Since the collector is conductively attached to shell 40' both collector current and body current will unidirectionally flow through conductor 42 and sleeve 41 to conductor 44 and thence to B+ of the cathode power supply 44' to which conductor 44 is connected while the B− of the cathode power supply is connected to the cathode. It is seen that the current flowing in sleeve 41 is oppositely directed to the beam current and since it is composed of both body current and collector current it is in reality total current or current supplied to the cathode and will generate a flux in core 47 in a direction opposite to the direction of the flux in core 47 induced therein by the beam current. The resultant flux in core 47 is directly proportional to body current and will induce in winding 48 a current directly proportional to body current.

It is readily seen that this technique provides an accurate indication of body current in high power particle discharge devices wherein only a single measuring device is required and thus eliminates the possibility of errors due to mismatched transformers, etc. Suitable monitoring instrumentation can be attached to leads 49.

In FIG. 4 is illustrated another alternative embodiment for measuring body current directly in a high power electron discharge device. In this embodiment the collector structure 51 is again conductively connected to the shell 52. Cavity end plates 53 support drift tube interaction means generally indicated at 54. Waveguide output means is shown at 59 coupled to output cavity 60 through iris 58. A conductive member 55 which could be of copper or the like is conductively connected between the last cavity end plate 53 and the collector structure. Surrounding member 55, which for illustrative purposes is shown as an L-shaped bar, is a transformer 56 comprising magnetic core and measuring winding or line wound thereon in a manner as previously described. An electron beam 57 traverses the tube length and electrons deviating from the main beam induced body currents in the shell structure made of stainless steel or the like. This current flows through the shell structure to the collector. If the member 55 is made of copper and the shell of stainless steel, for illustrative purposes, then knowing the relative resistance of the shell material and the member 55 conventional instrumentation can be used to monitor the current flowing in member 55 and thus the current flowing in the shell at the portion straddled by the bar member 55 can be easily obtained. The ends of member 55 are conductively attached to the shell and collector members so as to monitor body current in the shell just prior to the entrance of the beam into the collector and thereby obtain an accurate indication of body current. The body current in the shell structure will split between the member 55 and the shell and the portion flowing within bar 55 will induce current in the winding of transformer 56 and as mentioned above suitable instrumentation can be provided to obtain a direct measurement of body current in the shell structure of an electron discharge device having a non-insulated collector structure.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A method of measuring current in a high power pulsed electron discharge device comprising the steps of:
   (a) forming a pulsed electron beam,
   (b) positioning a first magnetic member around the beam, and
   (c) positioning a measuring line around said member whereby the current induced in said measuring line is proportional to the beam current of said pulsed beam,
   (d) positioning a second magnetic member around the leads to the cathode from which the beam emanates,
   (e) positioning a measuring line around said second magnetic member whereby the current induced in said second measuring line is proportional to the current supplied to said cathode, and
   (f) connecting the two measuring lines in subtractive relationship whereby the two currents induced in said first and second measuring lines produce a resultant current proportioned to the body current of said electron discharge device.

2. A high power pulsed electron discharge device comprising:
   (a) cathode means for producing a pulsed electron beam,
   (b) cathode lead means for supplying current to said cathode means,
   (c) collector means for absorbing said beam current,
   (d) metallic body means surrounding said beam between said cathode means and said collector means and conductively connected to said collector means whereby body current will be induced in said body by said electron beam, said metallic body means including beamwave interaction means for supporting electromagnetic wave energy and for providing means for exchanging energy between electromagnetic wave energy and said electron beam, and
   (e) measuring means disposed about said beam and near said collector means for determining the beam current supplied to said collector means, said measuring means being disposed relative to said beam such that said beam current can be measured by said measuring means without any beam particles impinging on said measuring means.

3. The device of claim 2 and further including means surrounding said cathode lead means for determining the current supplied to said cathode means.

4. The device of claim 3 and further including means for comparing the cathode current and the current supplied to the collector to thereby obtain an indication of the body current of said electron discharge device.

5. The device of claim 3 wherein the collector current measuring means and the cathode current measuring means include magnetic members having windings wound thereon surrounding said beam near said collector means and said cathode lead means respectively.

6. A high power pulsed electron discharge device comprising:
   (a) means for producing a pulsed electron beam and directing said beam along a beam axis,
   (b) means for collecting said beam,
   (c) metallic body means disposed about said beam axis between said producing means and said collecting means and conductively connected to said collector means to form an enclosure therewith,
   (d) a conductive member connected to said collecting means and said body means on the outwardly directed surfaces thereof, and
   (e) measuring means surrounding said conductive member, said measuring means and said conductive member adapted and arranged so as to produce an induced current in said measuring means proportional to the body current in said electron discharge device generated by electron beam impact on said metallic body means between said means for producing said pulsed electron beam and said measuring means.

7. A high power discharge device capable of being operated in a pulse fashion comprising:
   (a) means for producing a pulsed electron beam,
   (b) means for collecting said beam,
   (c) intermediate metallic body means interconnecting said means for producing a pulsed beam and said means for collecting said beam current such that a vacuum envelope is formed thereby, said metallic body means including beam-wave interaction means for supporting electromagnetic wave energy and for providing means for exchanging energy between electromagnetic wave energy and said electron beam,
   (d) measuring means disposed internally of said vacuum envelope, said measuring means being inductively coupled to said beam in a manner such that said beam functions as a primary winding and said measuring means functions as a secondary winding of a transformer, said measuring means being disposed relative to said beam such that said beam current can be measured by said measuring means without any beam particles impinging on said measuring means, said measuring means being adapted and arranged to provide an indication through the mechanism of transformer induction which is proportional to the current in said beam.

8. A high power charged particle discharge device comprising:
   (a) means for producing a beam of charged particles,
   (b) means for collecting said charged particles,
   (c) conductive means surrounding said beam along a predetermined beam path and conductively connected to said collector means, and
   (d) measuring means inductively coupled to said beam near said collecting means whereby current induced in said measuring means is proportional to the current in said beam passing into said collecting means, said measuring means disposed relative to said beam such that said beam current can be measured by said measuring means without any beam particles impinging on said measuring means,
   (e) means for measuring the current supplied to said means for producing the charged particle beam,
   (f) and means for comparing the two currents being measured.

9. The device defined in claim 8 wherein said means for comparing the two currents being measured comprises means for indicating the resulting difference current to thereby provide an indication of body current in said device.

10. A high power pulsed electron discharge device comprising:
    (a) means for producing a pulsed electron beam and directing said beam along a beam axis,
    (b) means for collecting said beam current,
    (c) metallic body means conductively connected to said collector means and disposed about said beam axis,
    (d) coaxial sleeve conductor means disposed about said beam axis, said coaxial sleeve conductor means being conductively connected at one end portion thereof to said metallic body means and at the other end portion thereof to said means for producing said pulsed electron beam, and
    (e) measuring means disposed about said coaxial sleeve conductor means, said measuring means and said coaxial sleeve conductor means being coupled to said beam axis for providing an induced current in said measuring means proportional to the body current of said electron discharge device which is generated by electron impact on said metallic body means between said means for producing said pulsed electron beam and said measuring means.

(References on following page)

References Cited by the Examiner

UNITED STATES PATENTS

| | | | |
|---|---|---|---|
| 1,866,751 | 7/1932 | Butow | 324—127 |
| 2,684,453 | 7/1954 | Hansell | 330—45 X |
| 2,860,251 | 11/1958 | Pakswer. | |
| 2,994,009 | 7/1961 | Schmidt et al. | 313—5.48 |
| 3,071,737 | 1/1963 | Lam | 324—127 X |
| 3,152,238 | 10/1964 | Anderson | 250—49.5 X |

FOREIGN PATENTS 905,297  3/1954  Germany.

OTHER REFERENCES

American Machinist (Burton et al.) Feb. 23, 1959, pp. 95–98.

WALTER L. CARLSON, *Primary Examiner.*

E. L. STOLARUN, C. F. DUFFIELD,
*Assistant Examiners.*